(12) United States Patent
Bennett et al.

(10) Patent No.: US 6,902,281 B2
(45) Date of Patent: Jun. 7, 2005

(54) ADAPTIVE OPTIC MIRROR

(75) Inventors: Harald Earl Bennett, Ridgecrest, CA (US); Joseph J. Shaffer, Ridgecrest, CA (US); Jack D. Westfall, Ridgecrest, CA (US); Robert C. Romeo, Tucson, AZ (US); Melville C. Creusere, Danville, CA (US)

(73) Assignee: Bennett Optical Research, Inc., Ridgecrest, CA (US)

( * ) Notice: Subject to any disclaimer, the term of this patent is extended or adjusted under 35 U.S.C. 154(b) by 33 days.

(21) Appl. No.: 10/348,731

(22) Filed: Jan. 21, 2003

(65) Prior Publication Data

US 2003/0147162 A1 Aug. 7, 2003

Related U.S. Application Data
(60) Provisional application No. 60/351,926, filed on Jan. 23, 2002.

(51) Int. Cl.[7] .......................... G20B 7/182; G02B 26/00
(52) U.S. Cl. ...................................... 359/846; 359/849
(58) Field of Search ....................... 250/201.9; 359/846, 359/847, 849

(56) References Cited

U.S. PATENT DOCUMENTS

| | | | | |
|---|---|---|---|---|
| 4,280,756 A | * | 7/1981 | Albertinetti ................. | 359/295 |
| 4,628,275 A | * | 12/1986 | Skipper et al. ............... | 330/10 |
| 5,210,653 A | * | 5/1993 | Schell ......................... | 359/846 |
| 5,357,825 A | * | 10/1994 | Costello et al. ............ | 7/490.07 |
| 5,751,503 A | * | 5/1998 | Blackmon et al. .......... | 359/846 |
| 5,793,348 A | * | 8/1998 | Lee et al. ..................... | 345/98 |
| 6,293,680 B1 | * | 9/2001 | Bruns .......................... | 359/849 |

OTHER PUBLICATIONS

R.E. Aldrich, "Deformable Wavefront Correctors", Chapter 5, pp. 151–197, Adaptive Optics Engineering Handbook, R.K. Tyson, ed., Marcel Dekker, Inc. Publ. New York, copyright 2000.*

D.G. Bruns, et al., "Final prototype design for the adaptive secondary mirror of the 6.5–m MMT", Proc. of the SPIE vol. 3126, Adaptive Optics and Applications, R.K. Tyson and R.Q. Fugate ed., Aug. 1997.*

J. Huang, et al., "Dynamic Modeling and Identification of an Adaptive Optics System", Proc. 4th IEEE Conf. on Control Applications, pp. 456–463, Sep. 1995.*

J.W. Hardy, "Active Optics: A New Technology for the Control of Light", Proc. IEEE, vol. 66, No. 6, pp. 651–697, Jun. 1978.*

J. Huang, et al., "Control Designs for an Adaptive Optics System", 34th IEEE Conf. on Decision and Control, Proceedings, vol. 4, pp. 3753–3756, Dec. 1995.*

* cited by examiner

Primary Examiner—John Juba, Jr.
(74) Attorney, Agent, or Firm—Kenneth G. Pritchard

(57) ABSTRACT

An adaptive optic mirror has a cyanate faceplate supported by a backplate which permits a plurality of actuators to be connected directly to the faceplate. Each actuator is connected via a low impedance circuit to a master control which sets each actuator independently of the others to produce a contoured mirror surface.

2 Claims, 3 Drawing Sheets

ADAPTIVE OPTIC MIRROR

This application claims benefit of U.S. Provision application 60/351,926 filed Jan. 23, 2002.

BACKGROUND OF THE INVENTION

Telescopes between 20 and 100 meters in diameter are now being designed by the astronomical community. The telescopes are asked to achieve near-diffraction-limited performance. It is a tremendous challenge, since the larger the telescope, the harder diffraction-limited-performance is to achieve. New technology is needed. By using "transfer mirrors" similar to those described in this application this objective may be achievable. These new mirrors can be light weight, can be designed for use as either active or active/adaptive optics, and have important figure control advantages over mirrors in present large telescopes. Active optics involves the control of the optical figure by using actuators to push on the back of the mirror. These actuators are typically very powerful and slow. Adaptive optics are used to also correct the effect of the atmosphere on images formed by light that has passed through a significant thickness of air. Ideally their response time should be shorter than a millisecond. Previous actuators have typically been large, slow (compared to a millisecond) expensive devices. Usually they have been stacks of piezoelectric plates and the movement occurs because of the expansion or contraction of the piezoelectric material itself. Very large voltages are required to obtain displacements of several micrometers. The actuators in the mirrors are discs. The bowing of the disc magnifies the displacement of an actuator rod placed at the center of the disc. Voltages required are low, in our case ±50V. Also, since they are very light, the frequency response of these actuators is typically considerably shorter than one millisecond.

The scattered light level of these transfer mirrors will be over 10x less than normal telescope mirrors, a factor that is important in resolving dim objects near a bright object. The composition mirrors discussed here will have a low expansion coefficient similar to that of glass ceramics with extremely low thermal expansion coefficients such as Zerodur™ or ULE™, the lowest expansion coefficient materials known. Low expansion is important to obtain stable telescope operation at different temperatures. Since the composite mirrors can be relatively lightweight, and can also be adaptive with similar time constants, they become an enabling technology for constructing very large telescopes.

One application of these mirrors will be as beam directors used to transmit laser energy from the ground to power orbital transfer vehicles (OTV) in space. These OTV's can carry satellites from low earth orbit into mid-earth or geosynchronous orbit at a fraction of the cost of present chemical rockets, assuming that they are powered by ion engines. However these ion engines require large amounts of power. For example, a magnetoplasmadynamic (MPD) ion engine developed at the Jet Propulsion Laboratory in Pasadena, Calif., developed a thrust of 12.5N but required a power of 200 kW. Typical satellites in space generate powers of approximately 5 kW and it has been believed that nuclear electric generators in space will be required to use the MPD or the competing Hall Thruster technology. That conclusion is challenged by the development of large mirrors built up from the lightweight adaptive optic segments described in this application and powerful free electron lasers (FEL). An FEL laser has been designed and is ready to be built with an output of 200 kW. It can be upgraded to one megawatt, and could supply the needed power for the thruster if a means to project that power to the satellite existed. The transfer mirror technology described here for developing approximately one meter diameter adaptive telescope optic mirrors will be a building block for these large adaptive optic laser beam projectors. Since their diameter is so large the beam intensity in the atmosphere is less than the intensity of sunlight and they will provide an eye safe approach to help to solve the power problem in space.

Background materials may be found in "Ground-based adaptive optic transfer mirrors for space applications: I and II" of the First International Symposium on Beamed Energy Propulsion, Huntsville, Ala., Nov. 5–7, 2002, to be published in book form by American Institute of Physics.

BRIEF DESCRIPTION

The segment technology for building a large segmented mirror has the following elements:

1. Use of one of a variety of graphite filled cyanate ester composites in the thin faceplate of an adaptive optic mirror.
2. Achieving a very thin, flexible and tough faceplate which has an influence function comparable to the separation between actuators.
3. Means of measuring the influence function, mirror surface displacement and possible hysteresis induced by the actuator.
4. Actuators that are lightweight, small, with displacement approximately 25 millionths of a meter (i.e. 25 micrometers), minimum hysteresis, inexpensive, and possible to pack closely together so that the actuator spacing is as little as two centimeters.
5. Means of fastening the actuator rods connecting the actuator to the faceplate in a way that will not distort the faceplate surface.
6. Power supplies that will apply voltage to the actuators in such a way that the actuators' response is independent of frequencies up to a kilohertz, and linear with power supply voltage. Since the actuators used are capacitive in nature, to meet this requirement the effective impedance of the power supply, as seen by the actuator must be near zero.
7. Means for developing superpolished mandrels (i.e. surface microroughnesses over a range of surface covariance function lengths from one micrometer to 1000 micrometers) which are less than one nanometer. The technique described here is centrifugal elutriation.
8. A technique for assembling the faceplate onto the backing plate so that a good optical figure is preserved.
9. Means for mechanically adjusting the actuators to improve the optical figure when the mirror is at rest.
10. Fastening the outer edges of the faceplate to the backing plate in such a way that the faceplate remains undistorted and inductive or capacitive edge sensors can be applied to phase the various segments together.

DESCRIPTION OF THE PREFERRED EMBODIMENT

The adaptive optic mirror needs a faceplate. Ideally the faceplate of the adaptive optic mirror is made of composite material and is less than 1 mm thick and has an influence function of 5 cm. Actuators are spaced about 4 cm behind the faceplate. The influence function is defined as the lateral distance along which deflection will occur when a single actuator pushes up the faceplate. It is a measure of faceplate flexibility. The flexibility is important since the faceplate surface must be able to accurately contour the vertical and lateral irregularities of the wavefront. A measure of how closely spaced the wavefront irregularities are is the Fried coefficient $r_0$. Ideally the faceplate influence function should not be greater than $r_0$. At high altitudes where astronomical observatories are usually located $r_0$ values may reach 20 cm or more. At low altitudes they may be 4 cm or less. By making the plate thinner the influence function can be reduced. The composite material is very tough and not easily fractured. Faceplates as thin as 0.4 cm have been successfully made of composite material. If a faceplate this thin were made of glass, which has a similar Young's modulus and thus a similar thickness dependence of influence function, it would be almost impossible to keep such thin faceplates from fracturing. The use of this composite material is thus an important advance in adaptive optic mirrors.

Developing a supersmooth surface (less than 1 mm rms) on the faceplate optical surface is obtained by polishing the mandrel on which it is cast to a superpolish using centrifugal elutriation. The polishing slurry is contained in a rotating bowl and the centrifuge action separates the large polishing particles, which create optically rough surfaces (vertical deviations of 2 nanometers or more over lateral displacement on the surface of a wavefront of visible light to 200 wavelengths of visible light) from the small polishing particles, thus creating very smooth surfaces. One gets the smoothest surface by polishing with the finest particles. One controls the particle size by using a stirrer to mix up the slurry at the beginning of the polishing when the larger particles cause rapid polishing to occur and withdraw the stirrer as polishing continues, getting finer and finer particles, until one is polishing with nearly pure water at the end.

Figure 1:
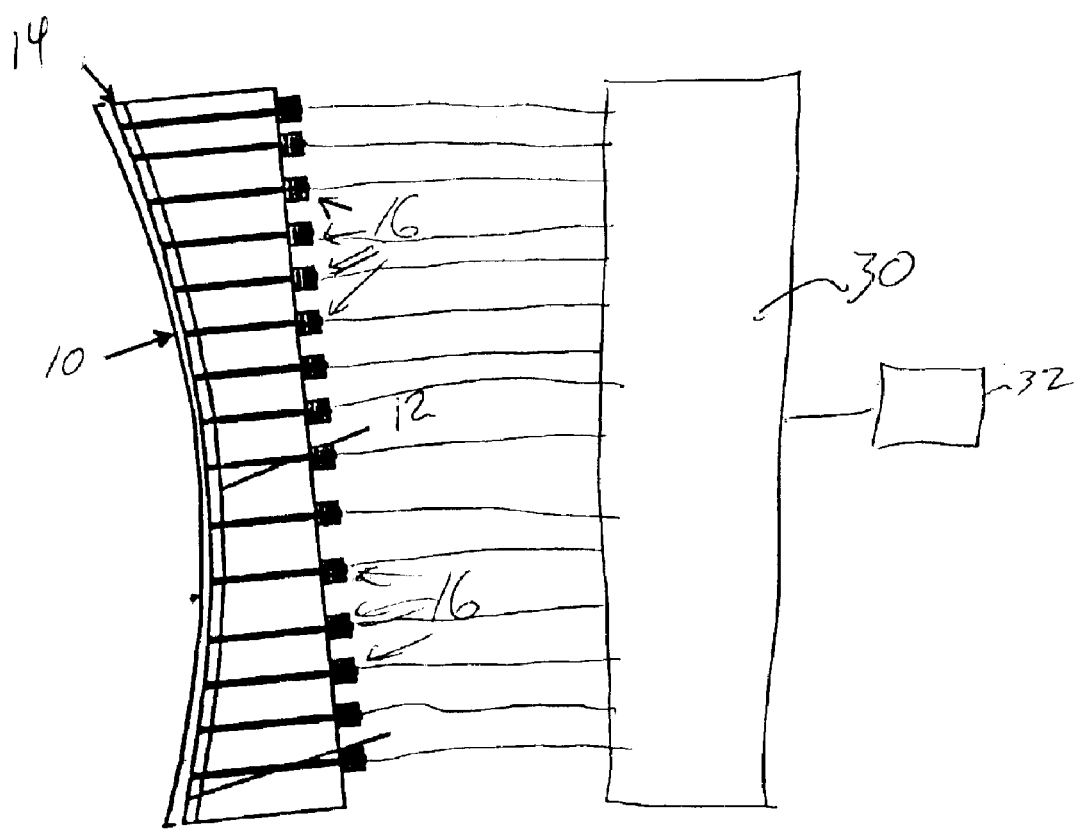
FIG. 1 is a side view schematic of the present invention.

A schematic of the final structure is given in FIG. 1. The faceplate 10 is formed against the mandrel and is not separated from it until the backing plate 12 and actuator structure are glued in place on the faceplate. It may be made out of a graphite-filled cyanate ester. There is a very small spacing 14 between faceplate 10 and backing plate 12 to introduce damping into possible harmonic faceplate oscillations. The aerial density is approximately 30 kg/m$^2$, giving an unexpectedly light weight for a round primary mirror one meter in diameter. It is about 25 kg or 52 lbs. The actuators have a response time of one millisec or higher and an actuator spacing and also influence function of two to four cm. Numerous actuators 16 are mounted behind backing plate 12.

Figure 2:
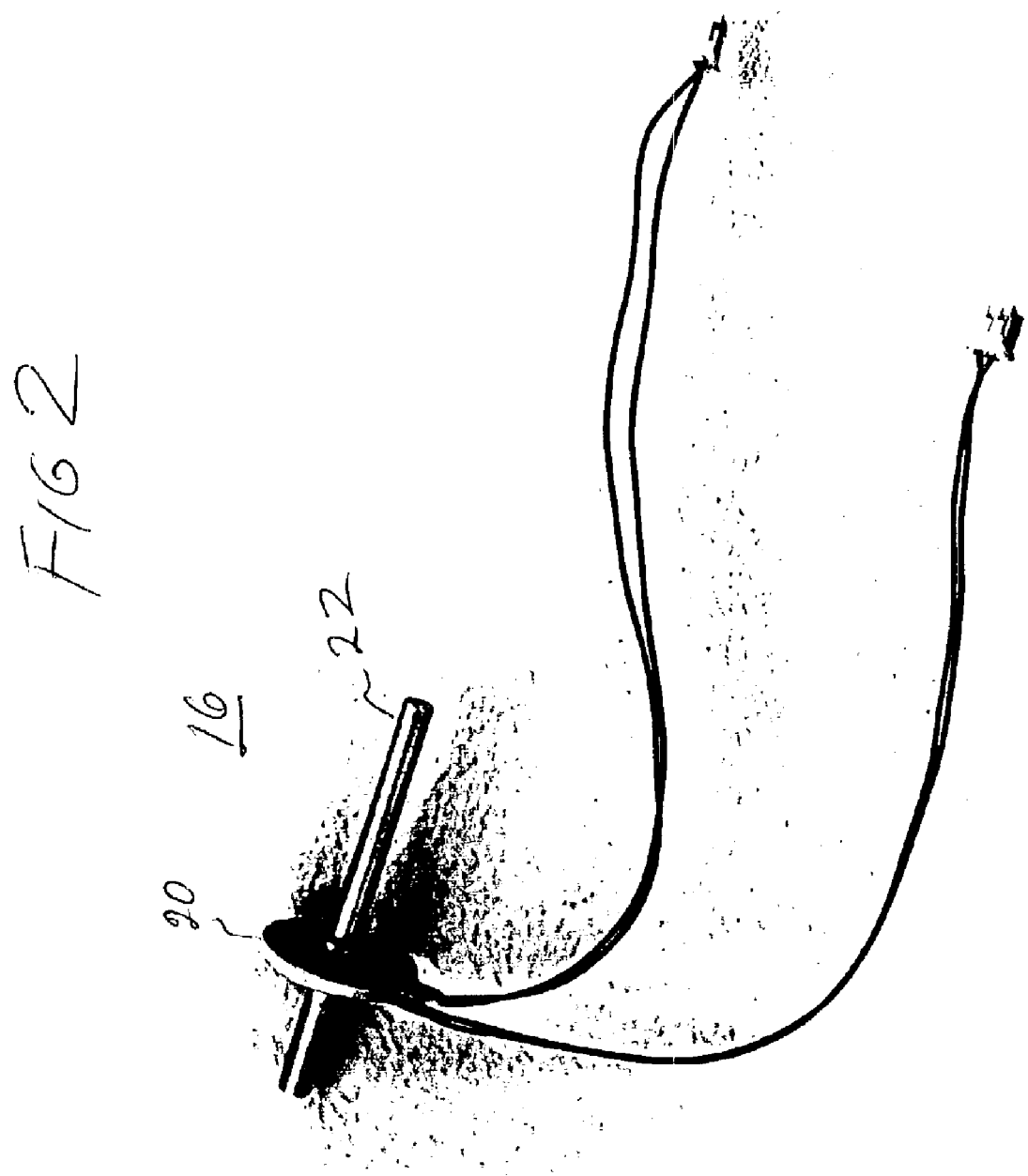
FIG. 2 is an example of a piezoelectric actuator for the present invention.

As shown in FIG. 2, the actuators 16 are piezoelectric actuators consisting of thin, commercially obtainable disks 20 of piezoelectric material fastened together at their edges. A thin rod 22 is glued to the center of disk 20 and extends up through a guide hole in the backing plate, preferably made of the same composite material as the faceplate and shaped so that there is minimum clearance between the back of faceplate 10 and the front of the backing plate 12. The rod 22 is glued to faceplate 10 using as an adhesive such as RTV-11 or equivalent visco-elastic material which remains slightly flexible and does not shrink significantly upon setting up. It does not distort the thin faceplate.

Actuators 16 are low voltage actuators driven at voltages of up to ±50V by a low impedance circuit 30 shown in FIG. 1. Low impedance circuit 30 is designed with operational amplifiers which allow it to show to each actuator 16 a source impedance of zero. Since actuators 16 are effectively a capacitive impedance, their throw is naturally inversely proportion to frequency. This circuit allows the same voltage to be applied to actuators 16 independent of frequency, and thus makes their throw independent of the frequency of the applied signal. Without this feature actuators 16 would be difficult to use in an adaptive optic system. Low impedance circuit 30 is thus a plurality of individual control circuits, one for each actuator 16. A master control 32 preferable a computer, is used to determine the position for each actuator 16 independent of the other actuator 16. This gives the specific configuration of the mirror surface.

Figure 3:
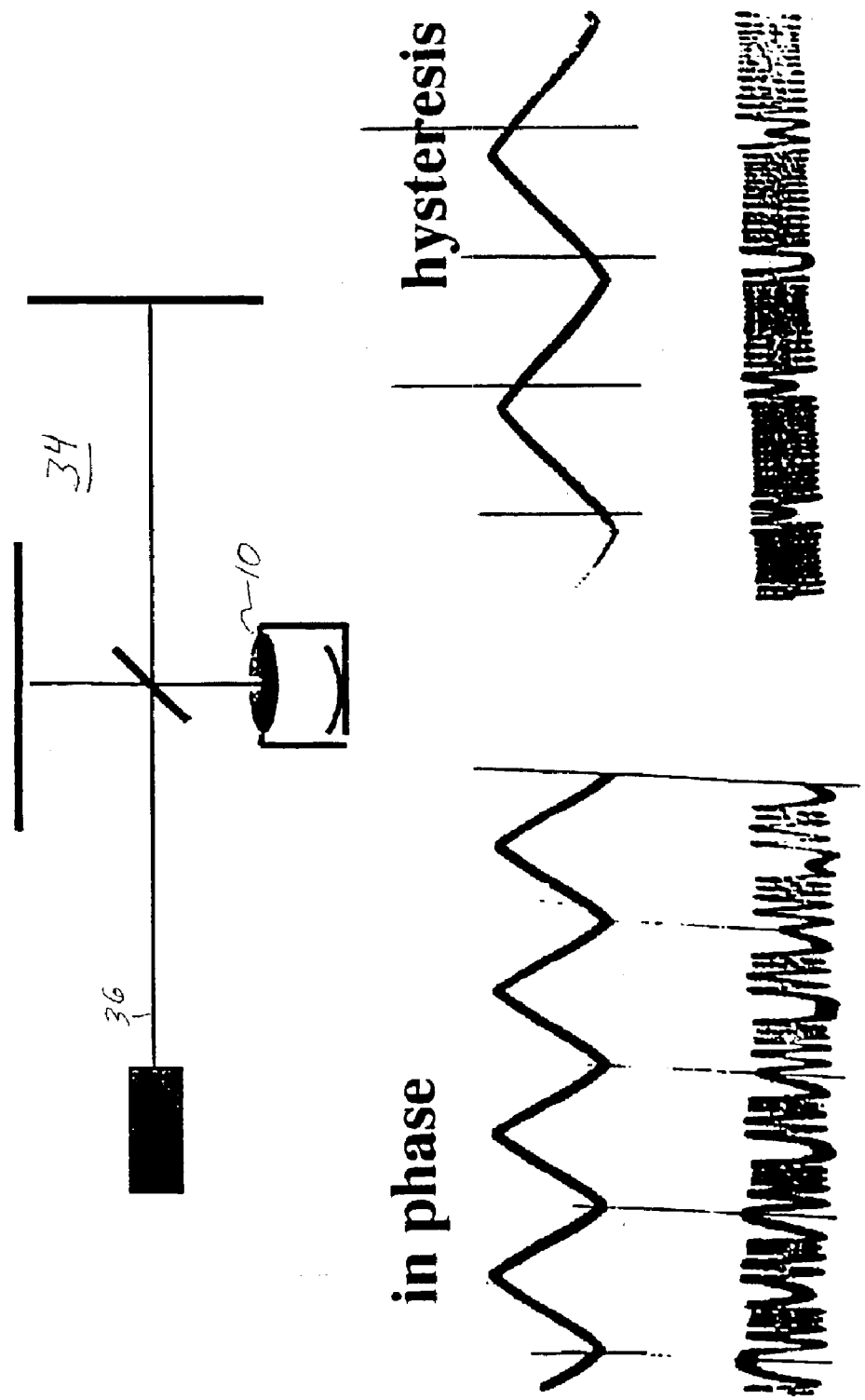
FIG. 3 is a diagram of the equipment and optical path to test for fringes.

A technique for accurately checking the operation of the actuators in the adaptive optic mirror has been devised and works well. It uses a Michelson interferometer 34 and results are shown in FIG. 3. The Michelson interferometer is a known device but this application for adaptive optic mirror use is novel. Referring to FIG. 3, a laser beam 36, (we used a 1 mW HeNe) which is about one mm in diameter, is directed to a position on faceplate 10 behind which an actuator 16 is mounted and applying the triangular ramp voltage seen on the double trace oscilloscope above the fringes, one forms interference fringes, seen on the bottom. The number of fringes gives the displacement of the surface resulting from the application of the ramp voltage to the actuator. The position of the fringes relate to the ramp voltage gives any phase deviation resulting from hysteresis. By changing the frequency of the ramp voltage one can watch the results of the displacement as a function of frequency and by changing the height of the peak voltage one can see how the actuator performs as a result of applied voltage. By moving the adaptive optic (AO) mirror one can see how the surface behaves as one moves away from the position of the actuator, which gives us the influence function and the effect on it of the various changes made above. One can check to see if the surface response is uniform from point to point on the mirror. All this from a simple Michelson interferometer.

The outer edges of faceplate 10 are fastened to backing plate 12 by glue or other suitable means and do not move. The best glue is one which is nonshrinking so that the spacing between the faceplate and backing plate remain constant. A small space between the two surfaces is intentionally left as described above. Capacitive or inductive sensors are fastened to the edges of each mirror to allow many mirrors one meter in diameter, for example, to be phased together to make one large mirror. Thus a plurality of adaptive optic mirrors each as shown in FIG. 1 may be connected. There are commercially available inductive edge sensors to phase the segments. Various astronomers in different countries are now planning to use phased mirrors such as this to make telescopes with primary mirrors as large as 100 meters in diameter. Long throw, low speed, linear actuators are also commercially available and will be used to tilt the mirror segments to phase the mirror edges as indicated by the edge sensors and to correct for global tip/tilt in the individual mirrors.

What is claimed is:

1. An adaptive optic mirror comprising:
   a faceplate of graphite filled cyanate ester of predetermined size, shape and influence function;
   a backing plate mounted to said faceplate so a small spacing exists between said faceplate and said backing plate;
   a plurality of low voltage actuators mounted to said face plate through said backing plate so as to change the shape of said faceplate in a predetermined manner said low voltage actuators driven by 50 volts or less;
   a low impedance circuit connected to each of said plurality of actuators such that each of said plurality of actuators is operated independent from all other of said plurality of actuators; and
   a master control connected to said low impedance circuit so as to operate each of said plurality of actuators so as to produce a desired mirror surface shape which may be modified as desired.

2. An adaptive optic mirror as described in claim 1 where said plurality of actuators are spaced closer together than the influence function of said faceplate.

* * * * *

UNITED STATES PATENT AND TRADEMARK OFFICE
CERTIFICATE OF CORRECTION

PATENT NO. : 6,902,281 B2
DATED : June 7, 2005
INVENTOR(S) : Bennett, Harold Earl et al.

It is certified that error appears in the above-identified patent and that said Letters Patent is hereby corrected as shown below:

Title page,
Item [75], Inventors, "Harald Earl Bennett" should be -- Harold Earl Bennett --.

Signed and Sealed this

Fourth Day of October, 2005

JON W. DUDAS
*Director of the United States Patent and Trademark Office*